(12) United States Patent
Chirhart et al.

(10) Patent No.: US 7,329,447 B2
(45) Date of Patent: Feb. 12, 2008

(54) RETROREFLECTIVE SHEETING WITH CONTROLLED CAP-Y

(75) Inventors: Dennis J. Chirhart, West St. Paul, MN (US); Mark A. Young, Brownwood, TX (US); Steven B. Kelley, Brownwood, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 463 days.

(21) Appl. No.: 10/815,366

(22) Filed: Apr. 1, 2004

(65) Prior Publication Data

US 2005/0221042 A1    Oct. 6, 2005

(51) Int. Cl.
*G02B 5/124* (2006.01)

(52) U.S. Cl. .................. 428/40.1; 359/529; 359/530; 428/40.2; 428/40.9; 428/41.6; 428/42.1; 428/167; 428/168; 428/172

(58) Field of Classification Search ............... 428/40.1, 428/40.9, 41.6, 42.1, 167, 168, 172, 40.2; 359/529, 530

See application file for complete search history.

(56) References Cited

U.S. PATENT DOCUMENTS

| | | | |
|---|---|---|---|
| 4,025,159 A | 5/1977 | McGrath | |
| 4,153,412 A | 5/1979 | Bailey | |
| 4,801,193 A | 1/1989 | Martin | |
| 4,983,436 A * | 1/1991 | Bailey et al. | 428/40.4 |
| 5,064,272 A | 11/1991 | Bailey et al. | |
| 5,066,098 A | 11/1991 | Kult et al. | |
| 5,069,964 A | 12/1991 | Tolliver et al. | |
| 5,138,488 A | 8/1992 | Szczech | |
| 5,262,225 A | 11/1993 | Wilson et al. | |
| 5,272,562 A | 12/1993 | Coderre | |
| 5,387,458 A | 2/1995 | Pavelka et al. | |
| 5,450,235 A | 9/1995 | Smith et al. | |

(Continued)

FOREIGN PATENT DOCUMENTS

WO    WO 99/36806    7/1999

(Continued)

OTHER PUBLICATIONS

Zwahlen, Helmut T. et al., *Transportation Research Record No. 1327* Highway Operations, Capacity, and Traffic Control Visibility, Rail-Highway Grade Crossings, and Highway Improvement Evaluation (1991) "Color and Shape Recognition of Reflectorized Targets Under Automobile Low-Beam Illumination at Night" pp. 1-7.

*Primary Examiner*—Nasser Ahmad
(74) *Attorney, Agent, or Firm*—Sondra K. Nowak

(57) ABSTRACT

A retroreflective laminate sheeting has a viewing surface having a retroreflective layer which has a first cap-Y value of a viewing surface side thereof. A plurality of discrete pigmented indicia are disposed on the viewing surface side of the retroreflective layer. The pigmented indicia define a second cap-Y value of the viewing surface of the sheeting, the second cap-Y value being less than the first cap-Y value. One method of making a retroreflective sheeting includes forming a retroreflective layer on a web, the web moving in a web direction. The method includes applying a pigmented material proximate the retroreflective layer, the pigmented material preferably forming a plurality of parallel stripes oriented substantially in at least one of the web direction and a direction orthogonal to the web direction.

19 Claims, 3 Drawing Sheets

U.S. PATENT DOCUMENTS

| | | |
|---|---|---|
| 5,508,105 A | 4/1996 | Orensteen et al. |
| 5,605,761 A | 2/1997 | Burns et al. |
| 5,614,286 A | 3/1997 | Bacon et al. |
| 5,691,846 A | 11/1997 | Benson, Jr. et al. |
| 6,120,636 A | 9/2000 | Nilsen et al. |
| 6,139,158 A | 10/2000 | Nilsen et al. |
| 6,224,792 B1 | 5/2001 | Janovec |
| 6,323,266 B2 | 11/2001 | Phillips |
| 6,325,515 B1 * | 12/2001 | Coderre et al. ............. 359/530 |
| 6,479,417 B2 | 11/2002 | Frey et al. |
| 6,481,857 B2 | 11/2002 | Smith |
| 6,568,817 B1 | 5/2003 | Mimura et al. |
| 6,632,508 B1 | 10/2003 | Pellerite et al. |
| 6,652,954 B2 | 11/2003 | Nielsen et al. |

FOREIGN PATENT DOCUMENTS

| | | |
|---|---|---|
| WO | WO99/37470 | 7/1999 |
| WO | WO 01/79897 | 10/2001 |

* cited by examiner

RETROREFLECTIVE SHEETING WITH CONTROLLED CAP-Y

BACKGROUND OF THE INVENTION

The present invention relates generally to reflective articles. The invention has particular application to retroreflective sheeting.

Retroreflective materials are configured to receive light rays impinging upon a viewing surface and to alter the rays so that they are reflected back toward their sources. Retroreflective material is generally used to enhance the low-light visibility of an article to which the retroreflective material is attached. Such material is used in a variety of applications ranging from traffic signs to bicycle reflectors. By enhancing low-light visibility, retroreflective materials enhance safety, provide decoration, and increase conspicuity in general.

Two known types of retroreflective material include microsphere-based sheeting and cube corner sheeting. Microsphere-based sheeting, sometimes referred to as "beaded" sheeting, employs a multitude of microspheres typically at least partially imbedded in a binder layer and having associated specular or diffuse reflecting materials (e.g., pigment particles, metal flakes, vapor coats) to retroreflect incident light. In general, however, such sheeting has a lower retroreflective efficiency than cube corner sheeting.

Cube corner retroreflective sheeting comprises a body portion typically having a substantially planar viewing surface and a structured surface comprising a plurality of cube corner elements such as cube corner projections and cube corner cavities. Each cube corner element comprises three approximately mutually perpendicular optical faces that intersect at a cube apex or, where the cube apex is truncated, that otherwise converge at an uppermost portion. It is known to treat the structured surface with a specularly reflective coating to improve performance at high entrance angles. An example of this is vapor-coated retroreflective sheeting.

Cube corner sheeting typically has a much higher retroreflectance than beaded sheeting, where retroreflectivity or brightness (these terms are used interchangeably herein) is expressed in units of candelas per lux per square meter. However, certain graphics applications require not only certain levels of retroreflectance but also particular levels of daytime "whiteness." The whiteness of an object is sometimes described in terms of the second of the tristimulus coordinates (X,Y,Z) for the object, and thus is referred to as "cap-Y." The cap-Y scale ranges from 0 for a perfectly black object to 100 for a perfectly white object.

BRIEF SUMMARY OF THE INVENTION

A retroreflective laminate sheeting has a viewing surface having a retroreflective layer which has a first cap-Y value of a viewing surface side thereof. A plurality of discrete pigmented indicia are disposed on the viewing surface side of the retroreflective layer. The pigmented indicia define a second cap-Y value of the viewing surface of the sheeting, the second cap-Y value being less than the first cap-Y value. One method of making a retroreflective sheeting includes forming a retroreflective layer on a web, the web moving in a web direction. The method includes applying a pigmented material proximate the retroreflective layer, the pigmented material preferably forming a plurality of parallel stripes oriented substantially in at least one of the web direction and a direction orthogonal to the web direction.

Figure 1:
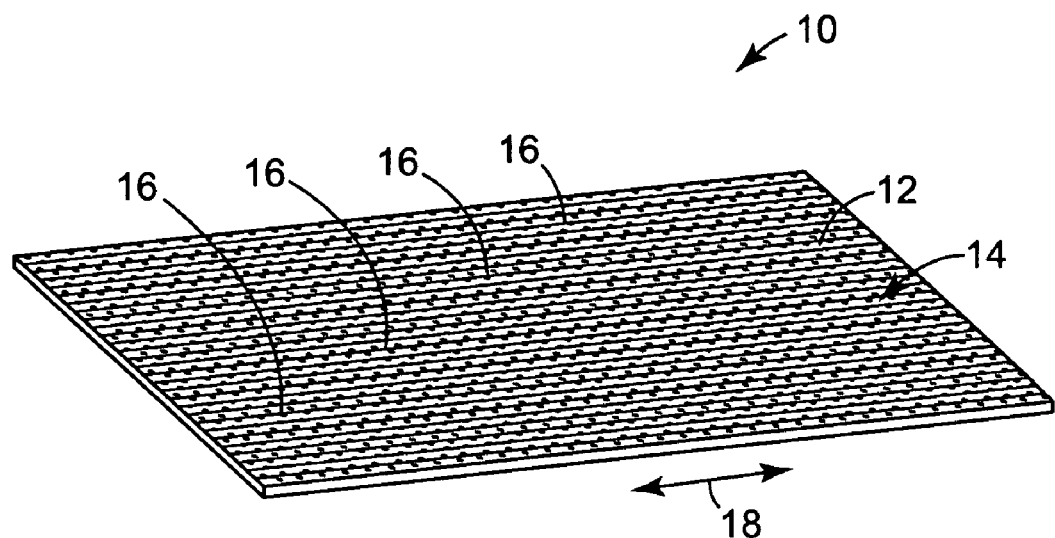
FIG. 1 is a perspective view of one embodiment of a retroreflective sheeting of the present invention.

While the above-identified drawing figures set forth several embodiments of the invention, other embodiments are also contemplated. This disclosure presents the invention by way of representation and not limitation. It should be understood that numerous other modifications and embodiments can be devised by those skilled in the art which fall within the scope and spirit of the principles of this invention. The figures may not be drawn to scale. Like reference numerals have been used throughout the figures to denote like parts.

DETAILED DESCRIPTION

The present invention relates to a laminate and an article comprising a retroreflective layer having a retroreflective viewing surface and an opposing surface and a plurality of discrete pigmented indicia proximate the viewing surface. An overlay layer may optionally be disposed on the retroreflective layer. As used herein "retroreflective viewing surface" refers to the surface of the retroreflective layer (e.g. retroreflective sheeting), laminate or article that is viewed by an observer. The retroreflective viewing surface of the laminate or article may be the retroreflective sheeting, the overlay layer (if present), as well as either of these layers further comprising other transparent layers or coatings disposed between the retroreflective surface of the sheeting and the observer.

Sheeting 10 shown in FIG. 1 is suitable for a number of applications including traffic and informational signs, clothing, vehicle markings, license plates, registration stickers, markers, flags, banners, tapes, decals, and any other applications where conspicuity or retroreflection is desired. While some applications benefit from sheeting with high levels of brightness and whiteness, in other applications, lower brightness or whiteness are desired. The present invention allows for the modification of existing retroreflective sheetings to meet the requirements of such latter applications without the need for developing new optical designs in the retroreflective layer. The present invention allows one to tailor the brightness and whiteness of a sheeting to the needed specification level by decreasing the brightness and/or whiteness of a particular retroreflective layer. The present invention allows for such customization in a much more cost effective and time efficient manner than developing new optical qualities for a retroreflective layer. Sheeting 10 includes a retroreflective layer 12 having a viewing surface side 14. Sheeting 10 also has a plurality of discrete pigmented indicia 16 disposed on the viewing surface side 14 of the retroreflective layer 12. Sheeting 10 can be formed from any retroreflective sheeting with the addition of pigmented indicia 16. The two most common types of retroreflective sheetings suitable for use are microsphere-based sheeting and cube corner-based sheeting.

Sheeting 10 includes pigmented indicia 16 that are shown in the form of parallel markings in the illustrated embodiment. In an exemplary embodiment, indicia 16 are disposed over the entire viewing surface side 14 of sheeting 10. Indicia can include sets of dots, or other suitable shapes. In one example, indicia 16 are in the form of stripes having a uniform width ranging between about 0.1 mm (about 4 mils) and about 1.0 mm (about 39 mils), and more preferably between about 0.254 mm (about 10 mils) and about 0.508 mm (about 20 mils). In an exemplary embodiment, indicia 16 are in the form of stripes having a distribution density of from about 2 to about 10 stripes per centimeter (about 5 to about 25 stripes per linear inch). Additionally, it is preferred that pigmented indicia 16 cover a portion of the retroreflective viewing surface side 14 ranging from about 10% to about 25%, although other ranges are possible.

In one method of producing retroflective sheeting 10, sheeting 10 travels in web direction 18. In the illustrated embodiment, pigmented indicia 16 are oriented substantially in web direction 18. In the present application, "brightness" or "retroreflectivity" are measured by a coefficient of retroreflection. "Whiteness" is measured by a "cap-Y" scale. Pigmented indicia 16 can be disposed on sheeting 10 in numerous variations of orientations, indicia sizing, indicia density, indicia placement, and indicia pigmenting to achieve a desired brightness and whiteness of the viewing surface side 14 of sheeting 10. Pigmented indicia 16 effectively mask the retroreflectiveness and whiteness of retroreflective layer 12. Thus, if less brightness is desired in sheeting 10, pigmented indicia 16 can be configured to cover a greater area of the viewing surface side 14 of sheeting 10. This can be accomplished, for example, by increasing the size of each discrete pigmented element or by increasing the density of elements, or a combination of both. If decreased whiteness is desired, pigmented indicia 16 can be pigmented to a darker color to decrease the cap-Y value.

Figure 2:
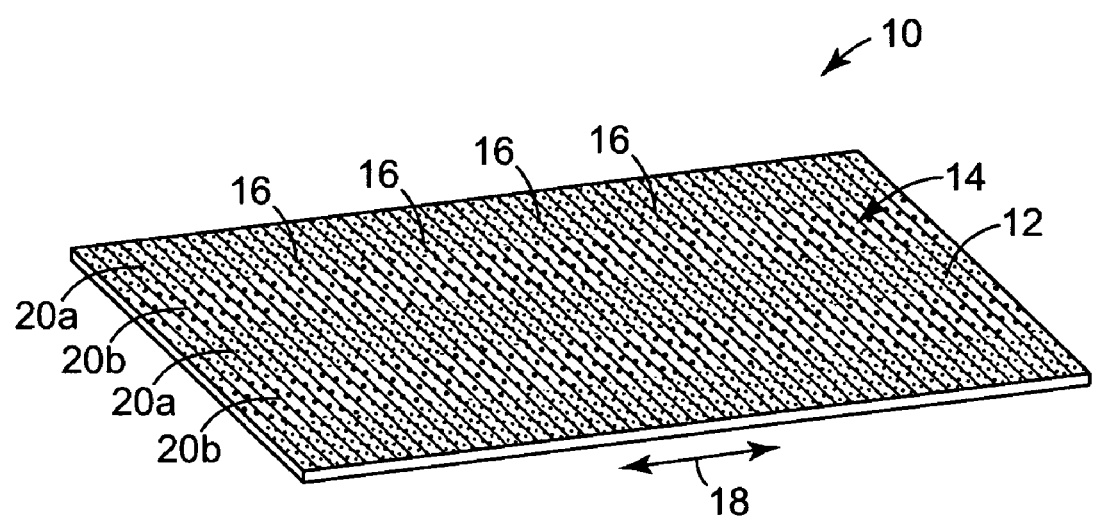
FIG. 2 is a perspective view of a second embodiment of a retroreflective sheeting of the present invention.

FIG. 2 is a perspective view of a second embodiment of a retroreflective sheeting 10. Sheeting 10 of FIG. 2 shows pigmented indicia 16 arranged in substantially parallel stripes which are substantially orthogonal to web direction 18. It is contemplated that sheeting 10 of FIG. 2 may further include pigmented indicia 16 oriented in substantially parallel stripes oriented in web direction 18, as shown in FIG. 1. In such a case, sheeting 10 would include a grid pattern of pigmented indicia 16. It is contemplated that other orientations and placements of pigmented indicia 16 could be used as desired for a particular application.

Sheeting 10 of FIG. 2 also has alternating bands 20a and 20b, which in this example are oriented substantially parallel to web direction 18. In an exemplary embodiment, the retroreflective elements of retroreflective layer 12 of band 20a are positioned with a first orientation. The retroreflective elements of retroreflective layer 12 of adjacent band 20b are oriented in a direction substantially orthogonal to the first orientation of the elements of band 20a. Thus, sheeting 10 exhibits comparable levels of retroreflectivity, regardless of the direction of viewing of sheeting 10. Bands 20a and 20b as shown are commonly referred to as "tiling." While bands 20a and 20b are illustrated as oriented substantially parallel to web direction 18, they could also be oriented in any other direction. Furthermore, the areas where retroreflective elements are disposed orthogonally to each other need not be in the form of bands as shown, but can instead constitute a checker board or other regular or irregular pattern.

Figure 3:
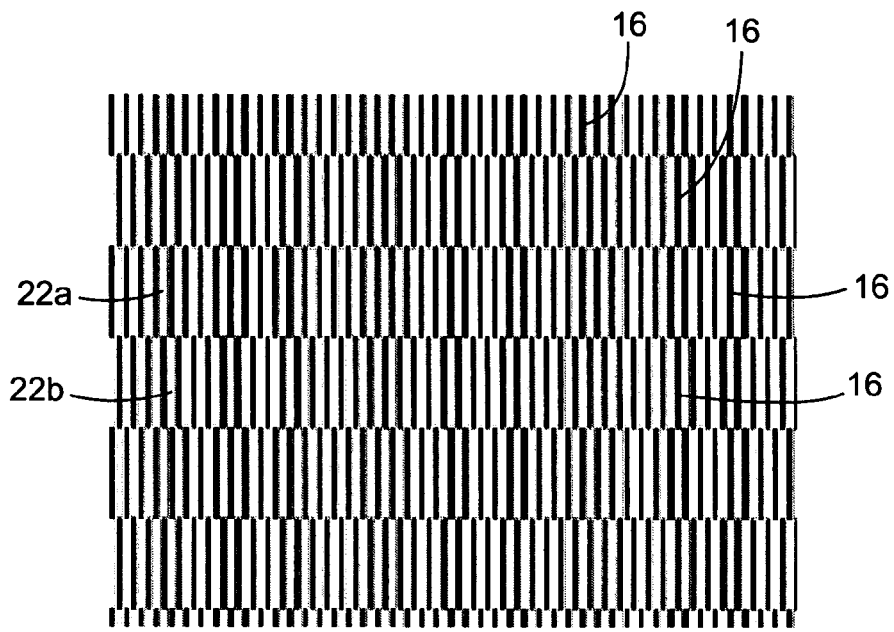
FIG. 3 is a top plan view of one embodiment of a pigmented indicia distribution.

FIG. 3 is a top plan view of one embodiment of a pigmented indicia distribution. As shown in FIG. 3, the pattern of discrete pigmented indicia 16 may include indicia of varying lengths and widths and can include a plurality of sets 22a and 22b of pigmented indicia 16, with the indicia 16 of set 22a offset from the indicia 16 of adjacent set 22b. As illustrated, indicia 16 are lines which are not continuous across an entire viewing surface side 14 of sheeting 10. The pattern of pigmented indicia 16 illustrated in FIG. 3 can be disposed on sheeting 10 in any orientation. Moreover, other patterns and orientations can be devised by those skilled in the art and are within the scope of the present invention. The indicia 16 illustrated include a plurality of sets of parallel stripes, wherein the stripes of one set are offset from the stripes of an adjacent set.

In accordance with the present invention, indicia 16 are preferably pigmented to be substantially gray, substantially black, or another color other than white, in order to reduce the whiteness of sheeting 10. Most black pigments are considered to be substantially black, though the relative levels of blackness may vary. "Substantially gray" includes pigments including a black pigment and at least some proportion of a non-black pigment. Indicia 16 are preferably formed of an opaque ink.

Figure 4A:
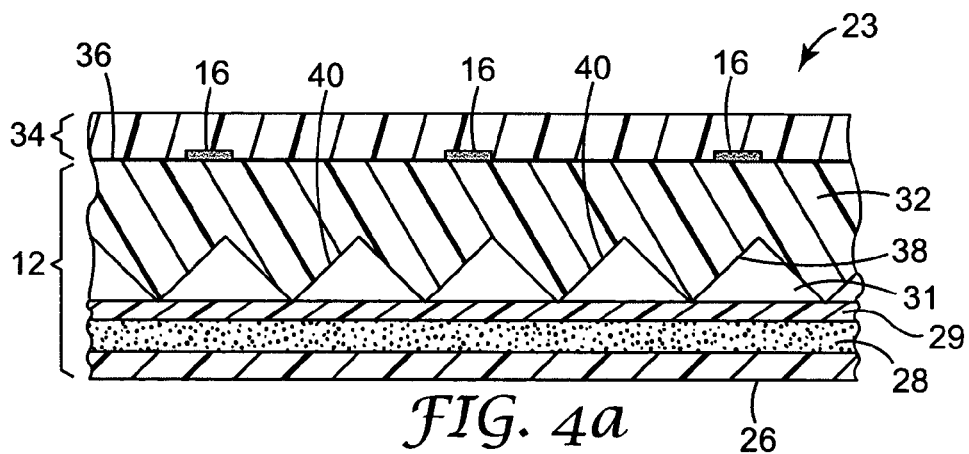
FIG. 4a is a sectional elevation view of one embodiment of a retroreflective sheeting of the present invention.

FIG. 4a is a sectional elevation view of one embodiment of a retroreflective sheeting of the present invention. Cube corner sheeting, sometimes referred to as prismatic, microprismatic, or triple mirror reflector sheetings, typically includes a multitude of cube corner elements to retroreflect incident light. Sheeting 23 comprises retroreflective layer 12 and overlay layer 34. Retroreflective layer 12 includes base layer 26, adhesive layer 28, seal film 29, and cube layer 32. In the illustrated embodiment, a plurality of air cavities 31 are disposed between seal film 29 and cube layer 32.

Preferably, base layer 26 is a liner such as a silicone coated release liner that is bonded to adhesive layer 28. In one embodiment, base layer 26 is clear or transparent. In one example, adhesive layer 28 is a pressure sensitive adhesive, however adhesive layer 28 can be any suitable adhesive. One specific example is tackified acrylic pressure sensitive adhesive.

Cube layer 32 can be any suitable cube layer adapted to reflect light back toward its source. In an exemplary embodiment, cube layer 32 is formed from a polycarbonate. In another embodiment, cube layer 32 is cast from an epoxy acrylate radiation curable resin. In one example, cube layer 32 includes substantially planar viewing surface 36 and structured surface 38, although other viewing surfaces are contemplated. In an exemplary embodiment, cube corner elements 40 are canted with respect to each other such that retroreflectivity is improved over a wider range of incident light angles.

Cube corner reflecting elements 40 include generally trihedral structures that have three approximately mutually perpendicular lateral faces meeting in a single corner: a cube corner. In use, the retroreflector 23 is arranged with viewing surface 36 disposed generally toward the anticipated location of intended observers and the light source. Light incident on the viewing surface 36 enters the sheeting 23 and passes through the body of the sheeting 23 to be reflected by each of the three faces of the elements 40, so as to exit the viewing surface 36 in a direction substantially toward the light source. Sheeting 23 relies on the principle of total internal reflection; therefore, the air interfaces in cavities 31 should remain free of dirt, water and adhesive. Accordingly, cube corner elements 40 are enclosed by seal film 29.

Cube corner retroreflective elements 40 are preferably hermetically encapsulated by seal film 29 through the application of heat and pressure or other techniques, as taught in U.S. Pat. No. 6,224,792 to Janovec, incorporated herein by reference. Seal film 29 typically has a first side facing a layer of retroreflective elements 40 and a second side typically having an adhesive layer 28 and a protective liner 26 disposed thereon. Seal film 29 preferably comprises a durable polymeric material. Some illustrative examples include thermoplastic, heat-activated, ultraviolet cured, and electron beam cured polymer systems. Preferred seal film 29 materials soften sufficiently to flow under pressure at between about 75° C. to about 95° C. but remain substantially firm at temperatures below about 65° C. Seal film 29 may be subsequently cured or crosslinked as taught in U.S. Pat. No. 4,025,159 (McGrath). Typical useful materials are acrylic-based monomers, such as polyethylene glycol diacrylates and hydroxymethyl diactone acrylamide and acrylic-based polymeric materials, such as acrylate or methylacrylate polymers or copolymers. An especially suitable material is co-polyethylene terephthalate ("COPET"). Seal film 29 may further comprise adjuvents, for example, a whitening pigment, such as titanium dioxide, or other suitable colorants. Seal film 29 is sufficiently thick to effectively seal cube corner retroreflective elements 40 and yet not so thick that material is wasted or sheeting 23 becomes so thick that edge sealing becomes more difficult. In an exemplary embodiment, the thickness of seal film 29 is at least about 0.03 mm (1.18 mils), more preferably at least about 0.06 mm (2.36 mils), but generally the thickness does not exceed about 0.3 mm (11.81 mils).

In instances where cube corner sheeting is employed as retroreflective layer 12, a backing layer may be present for the purpose of opacifying the laminate or article, improving the scratch and gouge resistance thereof, and/or eliminating the blocking tendencies of seal film 29. Illustrative examples of cube corner-based retroreflective sheetings are disclosed in U.S. Pat. Nos. 5,138,488 (Szczech); 5,387,458 (Pavelka); 5,450,235 (Smith); 5,605,761 (Burns); 5,614,286 (Bacon) and 5,691,846 (Benson, Jr.).

In an exemplary embodiment, pigmented indicia 16 are disposed on a surface of overlay layer 34 that is protected from the elements. The disposition of pigmented indicia 16 can be accomplished by the use of a rotogravure printing operation, for example. Those skilled in this technology can readily design, cut a gravure cylinder, and print overlay layer 34 using this method. Alternatively, pigmented indicia 16 can be disposed on cube layer 32.

In an exemplary embodiment, overlay layer 34, which is substantially transparent and preferably tear-resistant, is disposed on at least one surface of retroreflective layer 12. Retroreflective layer 12 may be bonded directly to overlay layer 34 or indirectly, by means of one or more intermediate layers such as tie layers, sealing layers, prime layers, etc. Overlay layer 34 is preferably disposed on the retroreflective viewing surface 36 of retroreflective layer 12.

Overlay layer 34 may also be called a cover film, top film, or top coat. Overlay layer 34 protects the optical elements of retroreflective layer 12 from a variety of possible destructive effects, such as dirt, water, and exposure to weather and outdoor conditions. Overlay layer 34 may be a single material but may also comprise layers of different materials. Materials selected for the overlay layer 34 are preferably dimensionally stable, durable, weatherable, and readily formable into a desired configuration. A representative material that is especially useful includes polymethylmethacrylate (PMMA). Illustrative examples of other overlay layer 34 materials are fluorinated polymers, ionomeric ethylene copolymers, low density polyethylenes, plasticized vinyl halide polymers, polyethylene copolymers, polyethylene terephthalate, cellulose acetate, cellulose acetate butyrate, ethylene/acrylate acid copolymers, acrylics, vinyl chloride, urethanes, ethylene acrylic acid copolymers, polyesters, fluoropolymers including polyvinylidene fluoride, and aliphatic and aromatic polyurethanes. Overlay layer 34 is selected to be sufficiently thick to provide the above desirable properties. The thickness of overlay layer 34 may preferably be between about 0.025 millimeters (0.98 mil) and about 0.25 millimeters (9.84 mils), and more preferably will be between about 0.05 millimeters (1.97 mils) and about 0.1 millimeters (3.94 mils). Overlay layer 34 may be multilayer as disclosed in U.S. Pat. No. 5,066,098 (Kult). In an exemplary embodiment, overlay layer 34 may have a Vicat softening point between about 140 degrees C. and about 170 degrees C. when tested according to ASTM D1525.

Retroreflective layer 12 and overlay layer 34 may be preconstructed and bonded by any suitable bonding technique such as melt bonding (e.g. high frequency welding and/or thermal welding), ultrasonic bonding, radio frequency bonding and adhesive bonding. Alternatively, the retroreflective layer 12 and/or overlay layer 34 may be formed and bonded in-line. For example, in a preferred embodiment, radiation cured cube corner elements 40 may be cast directly onto overlay layer 34.

Overlay layer 34 is adapted for outside exposure. Thus, overlay layer 34 can have resistance to ultraviolet light, water, and impact. Further, overlay layer 34 is also suitable for exposure to temperatures ranging from about −30 degrees Celsius to over 60 degrees Celsius. Overlay layer 34 can include additives. In one example, overlay layer 34 includes an ultraviolet (UV) stabilizer. For example, overlay layer 34 can include a triazine UV absorber which is characterized by both broad-band UV absorption, peaking between 300-360 nm and low volatility to provide a combination of low color, excellent permanence, high temperature stability and UV stability. One such triazine UV absorber is sold under the brand designation Cyasorb UV-1164 from Cytec Industries in Batavia, Illinois. In addition to, or instead of a UV stabilizer, another form of additive can be added to overlay layer 34 to protect it from light. One example of such an additive is a hindered amine light stabilizer (HALS). One set of HALS compositions are those containing polymeric compounds made of substituted hydroxypiperidines, including the polycondensation product of a hydroxypiperidines with succinic acid or with a triazine. A particular HALS compound is the polycondensation product of 1-(2-hydroxyethyl)-2,2,6,6-tetramethyl-4-hydroxypiperidine with succinic acid. One group of suitable HALS compositions are available commercially, for example, under the trade designation "Tinuvin" (such as "Tinuvin 622") available from Ciba of Tarrytown, N.Y. Overlay layer 34 is preferably transparent and includes pigmented indicia 16 in one embodiment. Overlay layer 34 can be clear (uncolored) or it can be colored to add visual impact to sheeting 23. For example, if sheeting 23 will be used as a stop sign, overlay layer 34 can be colored red. Alternatively, cube layer 32 can be colored. In exemplary embodiment, yellow and orange sheetings 23 are colored in cube layer 32 and blue, green and red sheetings 23 are colored in overlay layer 34.

Pigmented indicia 16 are placed on overlay layer 34 either on the outer surface of layer 34 or on the inner surface between layer 34 and cube layer 32. In an exemplary embodiment, the inner surface of overlay layer 34 is printed with pigmented indicia 16. In addition to the rotogravure method described above, the pigmented indicia 16 can be screen printed or otherwise provided onto overlay layer 34 in a manner known in the art. Once pigmented indicia 16 are printed upon overlay layer 34, layer 34 is laminated, e.g., heat laminated, or otherwise attached to cube layer 32 to form retroreflective sheeting 23. Such lamination can be effected in any suitable manner.

An exemplary retroreflective sheeting 23 in accordance with the above teachings was prepared as follows. A PMMA overlay film 34 was printed with indicia 16 using a vinyl-based ink having a titanium dioxide pigment. A polycarbonate cube layer 32 was then prepared using standard thermal processing methods. The overlay layer 34 was laminated to the cube layer 32 using standard heat lamination techniques, while ensuring that the printed side of the overlay layer 34 faced the cube layer 32, thus burying the printed indicia 16 under the overlay 34. Structured surface 38 of cube layer 32 was sealed with seal film 29 by application of heat and pressure. Seal film 29 was coated on an opposite side with pressure sensitive adhesive layer 28. Release liner 26 was added to complete the retroreflective sheeting 23.

Figure 4B:
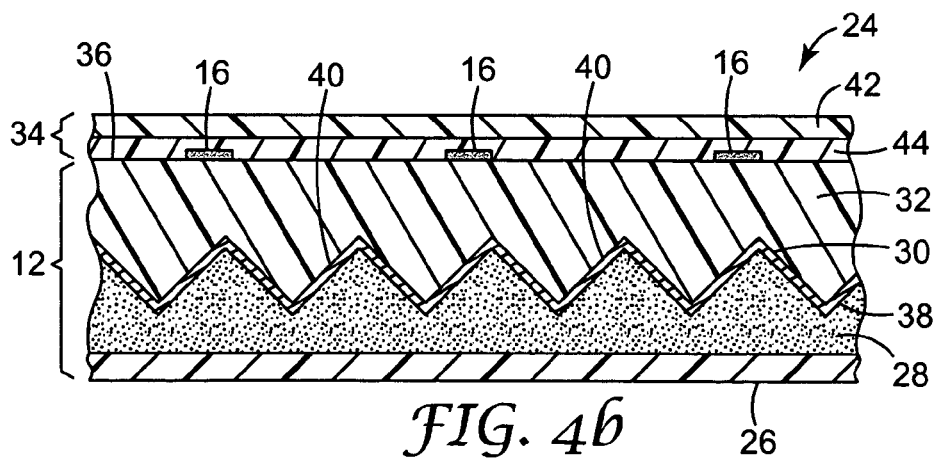
FIG. 4b is a sectional elevation view of a second embodiment of a retroreflective sheeting of the present invention.

FIG. 4b is a sectional elevation view of a cube-corner retroreflective sheeting 24 in accordance with a second embodiment of the present invention. Sheeting 23 comprises retroreflective layer 12 and overlay layer 34. Retroreflective layer 12 includes base layer 26, adhesive layer 28, metallic layer 30, and cube layer 32. Overlay layer 34 includes cover film 42 and layer 44.

Adhesive layer 28 is adhered to base layer 26 and metallic layer 30, which can be preferably a coating of vaporized aluminum that is deposited onto cube layer 32. Use of a suitable primer material such as a titanium metal sputter coated on cube layer 32 has been found to enhance the adhesion of the vapor deposition. As is known, use of a metallic layer, such as layer 30, increases the entrance angularity of cube layer 32.

In an exemplary embodiment, overlay layer 34 is constructed from layers of polyester and copolyester such as layers of polyethylene terephthalate and co-polyethylene terephthalate (PET/COPET). The term "co-polyethylene terephthalate" ("COPET") refers to a copolymer of polyethylene terephthalate and another monomer such as isophthalate. In an exemplary embodiment, overlay layer 34 is formed by coextruding two resins. Exemplary polyester material is commonly available from Eastman Chemical Company of Kingsport, Tennessee. Exemplary copolyester material is available from Eastman Chemical Company of Kingsport, Tennessee, under the brand designations: Spectar Copolyester 14471; Eastar PCTG Copolyester 5445; and Eastar Copolyester GN071. A suitable copolyester material, having a weight ratio of 80% PET and 20% COPET, is manufactured by 3M Company of St. Paul, Minn., and designated "80/20." In an exemplary embodiment, layer 34 is a PET/COPET bilayer where layer 42 is PET and layer 44 is COPET.

In an exemplary embodiment, overlay layer 34 includes substantially transparent cover film 42, pigmented or unpigmented layer 44, and pigmented indicia 16. Transparent cover film 42, which is preferably tear-resistant, is disposed on at least one surface of retroreflective layer 12. Retroreflective layer 12 may be bonded directly to cover film 42 or indirectly, by means of one or more intermediate layers such as tie layers, sealing layers, prime layers, etc. Cover film 42 is preferably disposed on the retroreflective viewing surface 36 of retroreflective layer 12.

Pigmented or unpigmented layer 44 is preferably transparent and includes pigmented indicia 16 in one embodiment. Layer 44 can be clear (uncolored) or it can be colored to add visual impact to sheeting 24. For example, if sheeting 24 will be used as a stop sign, layer 44 can be colored red. Alternatively, layer 42 can be colored. Also, the cube layer 32 can be colored. In exemplary embodiment, yellow and orange sheetings 24 are colored in cube layer 32 and blue, green and red sheetings 24 are colored in layer 44. In an exemplary embodiment, the inner surface of overlay layer 34 is printed with pigmented indicia 16. Layer 44 is preferably constructed from COPET, which is easier to print on than PET. In one example, the ink used for indicia 16 is vinyl based with a titanium dioxide pigment and is compatible with the COPET layer 44 on which it is printed.

Heated lamination is particularly advantageous for retroreflective sheeting 24 with a PET/COPET overlay layer 34. When the indicia 16 are printed upon the COPET layer 44, solvent in the ink can cause some crystallization of the COPET layer 44, and thus cloud the layer 44 to some extent. Re-heating the crystalline COPET (such as during a heated lamination) can convert it to an amorphous state and thus increase the clarity of the layer 44. Additionally, the bond between the PET layer 42 and COPET layer 44 can be enhanced when subjected to the heated lamination. A PET/COPET bilayer 34 has some advantages over PMMA. For example, PET/COPET is typically less expensive than PMMA, and does not require an additional smoothing film when heat laminating the overlay layer 34 to the cube layer 32. PET/COPET is also less brittle and thus less prone to fracturing.

In retroreflective sheetings 23, 24 shown in FIGS. 4a and 4b, light rays are typically reflected at the element faces 54 (shown in FIG. 5) due to total internal reflection or by reflective coatings, respectively. Preferred polymers for cube corner sheetings 23, 24 include poly(carbonate), poly(methylmethacrylate), poly(ethyleneterephthalate), aliphatic polyurethanes, as well as ethylene copolymers and ionomers thereof. Cube corner sheetings for use in sheetings 23, 24 may be prepared by casting directly onto a film, such as described in U.S. Pat. No. 5,691,846 (Benson) incorporated herein by reference. Preferred polymers for radiation cured cube corner sheetings include cross linked acrylates such as multifunctional acrylates or epoxies and acrylated urethanes blended with mono-and multifunctional monomers. Further, cube corner sheetings such as those previously described may be cast onto plasticized polyvinyl chloride film for more flexible cast cube corner sheeting. These polymers are preferred for one or more reasons including thermal stability, environmental stability, clarity, excellent release from the tooling or mold, and capability of receiving a reflective coating.

Figure 5:
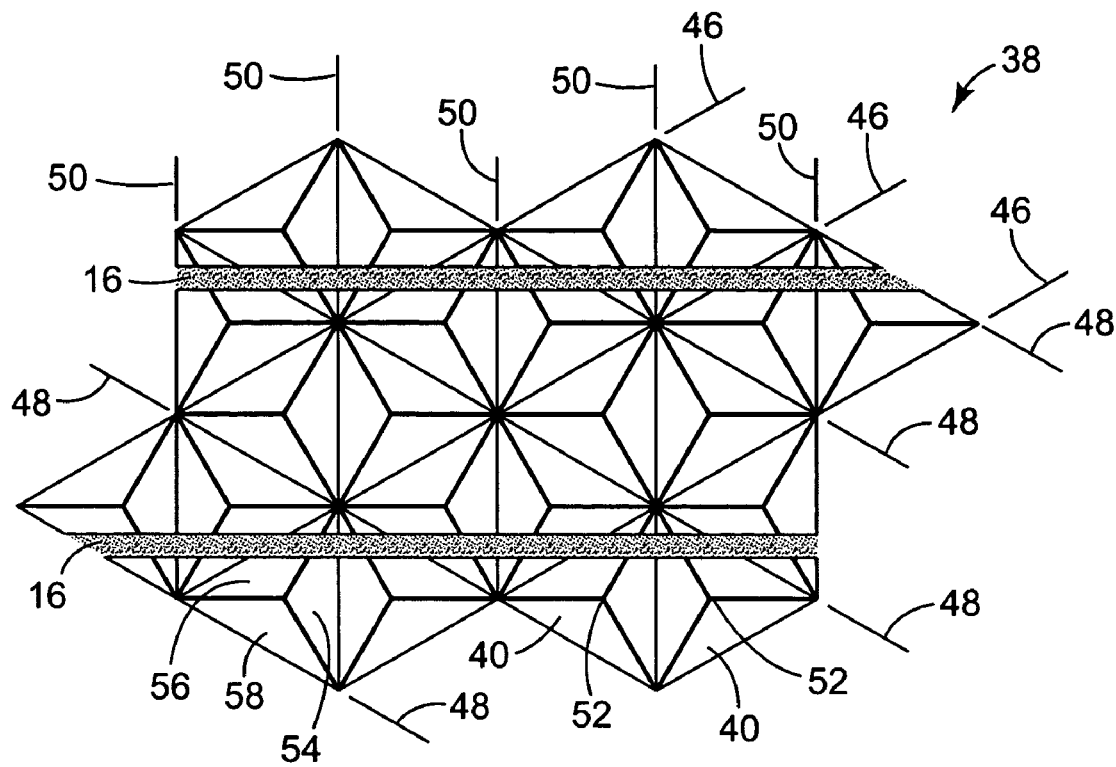
FIG. 5 is a top plan view of a portion of the retroreflective layer of FIG. 4.

FIG. 5 shows a magnified plan view of retroreflective sheetings 23, 24 as seen from viewing surface 36 where the structured surface 38 is visible in detail. Three sets of parallel grooves 46, 48, 50 are formed in the structured surface 38, defining cube corner elements 40 which each have three faces that converge at apexes 52. In one embodiment, apexes 52 protrude from structured surface 38 and are the rearmost extremities of elements 40, and the "bottom" or "vertex" of grooves 46, 48 and 50 (the front-most portion, where opposed groove side surfaces intersect) define triangular-shaped bases of elements 40. In another embodiment, cube corner elements 40 are inverted. The faces of each cube corner element 40 comprise mutually perpendicular groove side surfaces 54, 56, and 58.

The groove sets 46, 48 and 50 intersect each other at about 60 degree included angles. Although grooves 46, 48 and 50 are shown with angles of about 60 degrees, other suitable angles can be used. The faces of the cube corner elements are substantially smooth and, when metallized, are characterized by high specular reflectivity and small or negligible diffuse reflectivity. As illustrated, each cube corner element 40 is bounded by three sets of grooves, 46, 48, and 50. Cube corner elements bounded by two sets of grooves are also known.

In an exemplary embodiment of cube corner sheetings 23, 24, the cube corner elements 40 of retroreflective layer 12 and the pigmented indicia 16 for a given cube corner sheeting 24 are oriented so that the pigmented indicia 16 do not align with any of grooves 46, 48 or 50. Such an orientation allows for the greatest reduction and retroreflectiveness or brightness for a given area and pigment value of indicia 16.

In general, the coefficient of retroreflection of the retroreflective layer 12 varies depending on the optical qualities of the retroreflective structures. The two most common types of retroreflective sheeting suitable for use are microsphere-based sheeting and cube corner-based sheeting. In general, without pigmented indicia 16, retroreflective sheeting typically has a coefficient of retroreflection ranging from about 5 candelas per lux per square meter, for colored sheetings, to about 1500 candelas per lux per square meter, for white sheetings, at 0.2 degree observation angle and −4 degree entrance angle, as measured according to ASTM E-810 test method for coefficient of retroreflection of retroreflective sheeting. For cube corner sheeting, the coefficient of retroreflection is usually at least about 200 candelas per lux for fluorescent orange and at least about 550 candelas per lux for a white sheeting.

By adding pigmented indicia 16 to sheeting 10 as taught by the present invention, a coefficient of retroreflection and/or a whiteness level of a retroreflective sheeting 10 can be reduced in a controlled manner to a desired level. In an exemplary embodiment, a coefficient of retroreflection of sheeting 10 with pigmented indicia 16 is less than about 90%, more preferably less than about 70%, and even more preferably less than about 50% of a coefficient of retroreflection of a retroreflective sheeting without pigmented indicia 16.

Figure 6:
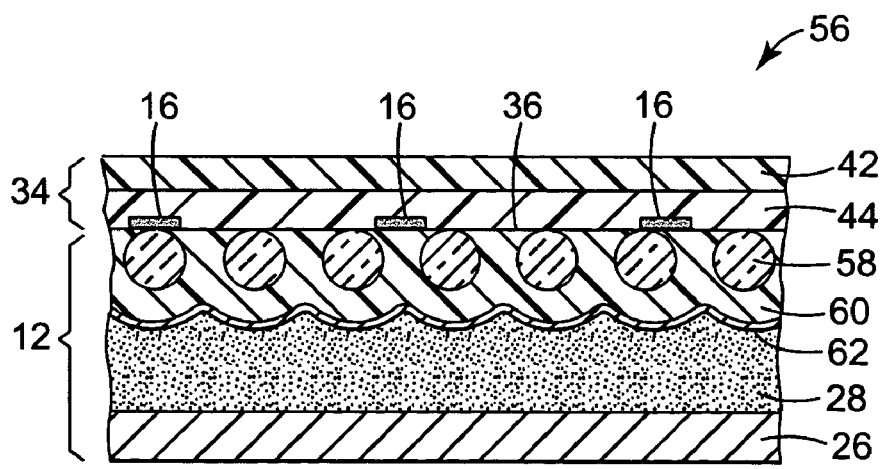
FIG. 6 is a sectional elevation view of a third embodiment of a retroreflective sheeting of the present invention.

FIG. 6 is a sectional elevation view of a third embodiment of a retroreflective sheeting of the present invention. Microsphere-based sheeting, sometimes referred to as "beaded sheeting," is well known to the art and includes a multitude of microspheres typically at least partially embedded in a binder layer and associated specular or diffuse reflecting materials (such as metallic vapor or sputter coatings, metal flakes, or pigment particles). "Enclosed-lens beaded sheeting" refers to retroreflective sheeting in which the beads are in spaced relationship to the reflector but in full contact with resin. "Encapsulated lens beaded sheeting" is designed such that the reflector is in direct contact with the bead but the opposite side of the bead is in a gas interface. Illustrative examples of microsphere-based sheeting are disclosed in U.S. Pat. No. 4,025,159 (McGrath); U.S. Pat. No. 4,983,436 (Bailey); U.S. Pat. No. 5,064,272 (Bailey); U.S. Pat. No. 5,066,098 (Kult); U.S. Pat. No. 5,069,964 (Tolliver); and U.S. Pat. No. 5,262,225 (Wilson).

FIG. 6 depicts a microsphere-based retroreflective sheeting 56 comprising an overlay layer 34 bonded to the retroreflective viewing surface 36 of retroreflective layer 12. Retroreflective layer 12 comprises a plurality of transparent microspheres 58 embedded in a binder layer 60, and a specular reflective layer 62. Binder layer 60 is also referred to as a cushion coat. In one embodiment, binder layer 60 has properties similar to those of seal film 29, discussed with reference to FIG. 4*a*. Retroreflective layer 12 contains a pressure sensitive adhesive layer 28 covered by a removable liner 26. In one exemplary embodiment, microsphere-based retroreflective sheeting 56 includes a monolayer overlay layer 34, similar to the overlay layer 34 discussed with reference to FIG. 4*a*. In the illustrated embodiment, microsphere-based retroreflective sheeting 56 includes overlay layer 34 having cover film 42 and layer 44, similar to overlay layer 34 discussed with reference to FIG. 4*b*. Further, in an exemplary embodiment, overlay layer 34 includes pigmented indicia 16, as discussed. Thus, it is contemplated that pigmented indicia 16, as taught by the present invention, can be used with any retroreflective layer 12 to control the retroreflectivity/brightness and/or whiteness/cap-Y of a resulting retroreflective sheeting. In an exemplary embodiment, pigmented material for indicia 16 is applied proximate the retroreflective layer; such disposition includes but is not limited to application to any part of overlay layer 34 and/or to any part of retroreflective layer 12.

EXAMPLES

The present invention is more particularly described in the following examples that are intended as illustrations only, since numerous modifications and variations within the scope of the present invention will be apparent to those skilled in the art. Unless otherwise noted, all parts, percentages, and ratios reported in the following examples are on a weight basis, and all materials used in the examples were obtained, or are available, from the suppliers described below.

Example 1

An exemplary retroreflective sheeting 23 was prepared in accordance with the teachings presented with reference to FIG. 4*a* above. Pigmented indicia 16 are printed onto overlay layer 34 with the following pigment distribution. A staggered pattern of pigmented indicia 16 similar to the pattern shown in FIG. 3 was used. However, in the example, each stripe was of uniform width of about 0.38 mm (about 15 mils), and each pigment line had a length of about 9.53 mm (about 0.375 inch). Each line was oriented substantially parallel to web direction 18, with a uniform distribution of about 6.3 lines per cm (about 16 lines per inch) in the cross-web direction (i.e., the direction substantially orthogonal to web direction 18). The lines of adjacent sets 22*a* and 22*b* were offset so that the lines of one set were positioned approximately halfway between the lines of an adjacent set. Pigmented indicia 16 covered about 25% of the viewing surface 36 of cube corner sheeting 23.

Pigmented indicia 16 were printed using a gray ink having about 10% black ink, by weight, and the balance white ink. The black gravure ink consists of C.I. Pigment Black 7, dispersed in a vinyl binder, solvated using ketone based solvents to reduce viscosity to printing range. The C.I. Pigment Black 7 is present in a concentration of about 7-12% by weight. The white gravure ink consists of titanium dioxide dispersed in a vinyl binder, solvated using ketone based solvents to reduce viscosity to printing range. The titanium dioxide is present in a concentration of about 15-20% by weight.

The colorants in this example, C.I. Pigment Black 7 and titanium dioxide, are predispersed typically in VAGH vinyl resin, available from Union Carbide, Danbury, Conn. These pigment predispersions or "chips" can be purchased commercially from vendors such as Penn Color, Doylestown, Pa.

Sheeting 23 of this example has a coefficient of retroreflection of about 629 candelas per lux per square meter at 0.2 degree observation angle and −4 degree entrance angle. This compares to a coefficient of retroreflection of about 900 candelas per lux per square meter at 0.2 degree observation angle and −4 degree entrance angle for the same sheeting without pigmented indicia 16. Sheeting 23 of this example has a whiteness measurement of about 35 on the cap-Y scale. This compares to a whiteness measurement of about 50 for the same sheeting without pigmented indicia 16.

Example 2

In a second embodiment of retroreflective sheeting 23, pigmented indicia 16 are printed onto overlay layer 34 with the following pigment distribution. A staggered pattern of pigmented indicia 16 similar to the pattern shown in FIG. 3 was used. However, in the example, each stripe was of uniform width of about 0.25 mm (about 10 mils), and each pigment line had a length of about 9.53 mm (about 0.375 inch). Each line was oriented substantially parallel to web direction 18, with a uniform distribution of about 10 lines per cm (about 25 lines per inch) in the cross-web direction. The lines of adjacent sets 22a and 22b were offset so that the lines of one set were positioned approximately halfway between the lines of an adjacent set. Pigmented indicia 16 covered about 25% of the viewing surface 36 of cube corner sheeting 23.

The gray ink used is the same as in Example 1. Sheeting 23 of this example has a coefficient of retroreflection of about 597 candelas per lux per square meter at 0.2 degree observation angle and −4 degree entrance angle. This compares to a coefficient of retroreflection of about 900 candelas per lux per square meter at 0.2 degree observation angle and −4 degree entrance angle for the same sheeting without pigmented indicia 16. Sheeting 23 of this example has a whiteness measurement of about 35 on the cap-Y scale. This compares to a whiteness measurement of about 50 for the same sheeting without pigmented indicia 16. Other values of retroreflectivity and whiteness can be obtained by changing, for example, the area of pigmented indicia 16, the placement of pigmented indicia 16 and the ink used for printing pigmented indicia 16.

Although the present invention has been described with reference to preferred embodiments, workers skilled in the art will recognize that changes may be made in form and detail without departing from the spirit and scope of the invention. For example, colorants (e.g. pigments and/or dyes), ultraviolet light absorbers, light stabilizers, free radical scavengers, antioxidants, processing aids such as antiblocking agents, releasing agents, slip agents, lubricants, and other additives may be added to the retroreflective layer, overlay layer, or both. All patent references cited herein are incorporated by reference.

The invention claimed is:

1. A retroreflective laminate sheeting having a viewing surface comprising:
   a retroreflective layer having cube corner-based sheeting that includes a structured surface provided with a plurality of cube corner elements that are bounded by at least two intersecting sets of parallel grooves, the retroreflective layer further having a first cap-Y value of a viewing surface side thereof; and
   a plurality of discrete pigmented indicia disposed on the viewing surface side of the retroreflective layer such that the pigmented indicia are not substantially aligned with the grooves, wherein the pigmented indicia define a second cap-Y value of the viewing surface of the sheeting, the second cap-Y value being less than the first cap-Y value.

2. The sheeting of claim 1 further comprising:
   a substantially transparent overlay layer having a front surface and a rear surface, the rear surface being proximate the viewing surface side of the retroreflective layer, wherein the pigmented indicia are disposed on a surface of the overlay layer.

3. The sheeting of claim 2, wherein the pigmented indicia are disposed between the rear surface of the overlay layer and the viewing surface side of the retroreflective layer.

4. The sheeting of claim 1, wherein the indicia comprise a plurality of parallel stripes.

5. The sheeting of claim 4, wherein the stripes have a substantially uniform stripe width.

6. The sheeting of claim 5, wherein the stripe width is from about 0.1 mm to about 1.0 mm.

7. The sheeting of claim 4, wherein the stripes have a distribution density of from about 2 to about 10 stripes per centimeter (about 5 to about 25 stripes per inch).

8. The sheeting of claim 4, wherein the stripes vary in width.

9. The sheeting of claim 4, wherein at least some of the stripes are not continuous.

10. The sheeting of claim 1, wherein the pigmented indicia are substantially gray.

11. The sheeting of claim 1, wherein the pigmented indicia are substantially black.

12. The sheeting of claim 1, wherein the pigmented indicia cover from about 10% to about 25% of the viewing surface side of the retroreflective layer.

13. The sheeting of claim 1, wherein the indicia comprise a plurality of sets of parallel stripes, and wherein the stripes of one set are offset from the stripes of an adjacent set.

14. The sheeting of claim 1, wherein the pigmented indicia comprise an opaque ink.

15. The sheeting of claim 1 further comprising:
   a transparent color layer.

16. The sheeting of claim 1 in which:
   the retroreflective layer has a first brightness value of a viewing surface side thereof; and
   the plurality of discrete pigmented indicia define a second brightness value of the viewing surface of the sheeting, the second brightness value being less than the first brightness value.

17. The sheeting of claim 16 in which the second brightness value is less than about 70% of the first brightness value.

18. The sheeting of claim 1 further comprising:
   an adhesive layer disposed on a side of the retroreflective layer opposite the viewing surface side; and
   a release liner disposed adjacent the adhesive.

19. The sheeting of claim 1 wherein the retroreflective layer comprises a web and the pigmented indicia comprise a plurality of stripes oriented substantially in at least one of the web direction and a direction orthogonal to the web direction.

* * * * *

UNITED STATES PATENT AND TRADEMARK OFFICE
CERTIFICATE OF CORRECTION

PATENT NO. : 7,329,447 B2  Page 1 of 1
APPLICATION NO. : 10/815366
DATED : February 12, 2008
INVENTOR(S) : Dennis J. Chirhart It is certified that error appears in the above-identified patent and that said Letters Patent is hereby corrected as shown below:

<u>Title Page, Col. 2 item [74] (Attorney, Agent, or Firm)</u>
Line 1, delete "Sondra" and insert -- Sandra --, therefor.

Signed and Sealed this

Seventeenth Day of June, 2008

JON W. DUDAS
*Director of the United States Patent and Trademark Office*